US009519303B2

United States Patent
Ballarin et al.

(10) Patent No.: US 9,519,303 B2
(45) Date of Patent: Dec. 13, 2016

(54) PRECISION CURRENT SENSING

(71) Applicant: Infineon Technologies AG, Neubiberg (DE)

(72) Inventors: Fabio Ballarin, Padua (IT); Marco Piselli, Padua (IT); Fabio Gini, Monteforte (IT); Stefano Zampieri, Padua (IT)

(73) Assignee: Infineon Technologies AG, Neubiberg (DE)

( * ) Notice: Subject to any disclaimer, the term of this patent is extended or adjusted under 35 U.S.C. 154(b) by 182 days.

(21) Appl. No.: 14/176,795

(22) Filed: Feb. 10, 2014

(65) Prior Publication Data

US 2015/0227157 A1    Aug. 13, 2015

(51) Int. Cl.
  G05F 3/26    (2006.01)
  H02M 3/158   (2006.01)
  G05F 3/22    (2006.01)

(52) U.S. Cl.
  CPC ............ G05F 3/262 (2013.01); G05F 3/265 (2013.01); *G05F 3/222* (2013.01); *H02M 3/1584* (2013.01)

(58) Field of Classification Search
  CPC ............. G05F 3/262; G05F 3/02; G05F 3/08; G05F 3/24; G05F 1/563; G05F 1/573; G05F 3/265; H02M 2001/008; H02M 3/137; H02M 3/156
  (Continued)

(56) References Cited

U.S. PATENT DOCUMENTS 6,600,362 B1 * 7/2003 Gavrila ................. G05F 3/262
                                                                  327/427
7,019,581 B1 * 3/2006 Potanin .............. H03K 17/0822
                                                                  327/427
(Continued)

FOREIGN PATENT DOCUMENTS

CN   101846700 A   9/2010
CN   103095263 A   5/2013

OTHER PUBLICATIONS

"100mA, Linear Regulator with Precision Current Limit and Diagnostic Outputs," Linear Technology, LT3050 Series, 2009 Datasheet, 26 pp.

(Continued)

*Primary Examiner* — Jessica Han
*Assistant Examiner* — Demetries A Gibson
(74) *Attorney, Agent, or Firm* — Shumaker & Sieffert, P.A.

(57) ABSTRACT

Example current tracking circuits and systems as well as methods for tracking current are described herein. In one example, a current tracking circuit comprises a current mirror that receives a power supply input and a control signal as inputs, wherein the current mirror has a mirror ratio. The current tracking circuit also comprises a programmability sub-circuit coupled to the current mirror that trims a value of the mirror ratio. In another example, a method comprises performing current mirroring using a current mirror comprising a sense device, wherein a mirror ratio of the current mirror is based on a programmable sub-circuit. The method further comprises maintaining, by a voltage regulation loop, a collector potential of the sense device within a threshold difference level of a collector potential of a power device coupled to the sense device, wherein the sense device mirrors a current flowing in the power device.

13 Claims, 6 Drawing Sheets

(58) Field of Classification Search
USPC ...... 363/21.09, 21.1; 323/351; 327/538–543, 327/384
See application file for complete search history.

(56) References Cited

U.S. PATENT DOCUMENTS

| | | | |
|---|---|---|---|
| 8,102,193 B2 | 1/2012 | Ha et al. | |
| 8,373,449 B2 | 2/2013 | Thiele et al. | |
| 8,710,810 B1* | 4/2014 | McJimsey | H02M 3/1584 |
| | | | 323/272 |
| 2004/0145409 A1* | 7/2004 | Inoue | G05F 3/222 |
| | | | 327/538 |
| 2005/0094690 A1* | 5/2005 | Kubota | H01S 5/042 |
| | | | 372/38.02 |
| 2009/0273874 A1* | 11/2009 | Yen | H02H 7/1203 |
| | | | 361/93.9 |

OTHER PUBLICATIONS

Office Action, in the Chinese language, from counterpart Chinese Application No. 201510068645.3, dated Aug. 15, 2016, 9 pp.

\* cited by examiner

PRECISION CURRENT SENSING

TECHNICAL FIELD

This disclosure is generally related to current sensing, and more particularly to current sensing using current mirroring.

BACKGROUND

A current sense circuit typically provides and/or measures a current and may be used in applications such as DC-DC converters for server and mobile computer applications. Some reasons for monitoring current (such as current in power supplies) include fault protection, current limiting, current regulation, and application specific reasons. Current sensing may aid with fault protection because the current sense may detect when there is a current overload that may lead to a fault, such as a short-circuit. Some applications may use a constant maximum current limitation, in order to be robust and reliable. A current sense circuit may detect an output current provided by a current regulator and feed the output current back to the regulation loop to achieve current regulation. Conventional tracking current sense circuits often have limited precision, which may be due to unavoidable tolerances or temperature changes. Furthermore, offsets introduced with amplifiers or comparators used in current sense circuits may add to imprecise measurements.

SUMMARY

In general, this disclosure describes tracking current sense systems having improved precision and programmability. Some example devices described herein sense current using a current mirror and include additional circuitry to the devices in order to add programmability of a mirror ratio of the current mirror. The current mirror may include a power transistor and a sense transistor. Additional example devices include a voltage regulation loop that maintains a collector-to-emitter potential of the power transistor at approximately the same level as a collector-to-emitter potential of the sense transistor.

The details of one or more examples and techniques of this disclosure are set forth in the accompanying drawings and the description below. Other features, objects, and advantages of the disclosure will be apparent from the description and drawings, and from the claims.

BRIEF DESCRIPTION OF DRAWINGS

The drawings are not necessarily drawn to scale. Like reference numbers indicate like features, although variations between like features may exist in the various examples.

DETAILED DESCRIPTION

Current tracking systems with current mirroring may have an error known as Early effect. The Early effect is an error introduced in a current mirror due to modulation of current in a bipolar transistor due to differences in collector-to-emitter potentials. Some current sensing devices and systems described herein include a voltage regulation loop that reduces the Early effect by maintaining a collector-to-emitter potential of a power transistor of the current mirror at approximately the same level as a collector-to-emitter potential of a sense transistor of the current mirror. Conventional current sensing circuits using current mirroring are configured to have only one mirror ratio. Some current sensing devices and systems described herein include a programmability sub-circuit that can be used to set a selected a mirror ratio. Furthermore, current sensing devices and systems described herein may be manufactured relatively cheaply with low cost technology and have a relatively small size. Thus, current sensing devices and systems described herein have improved accuracy, can be configured to operate with different mirror ratios, and are cost-effective.

Figure 1:
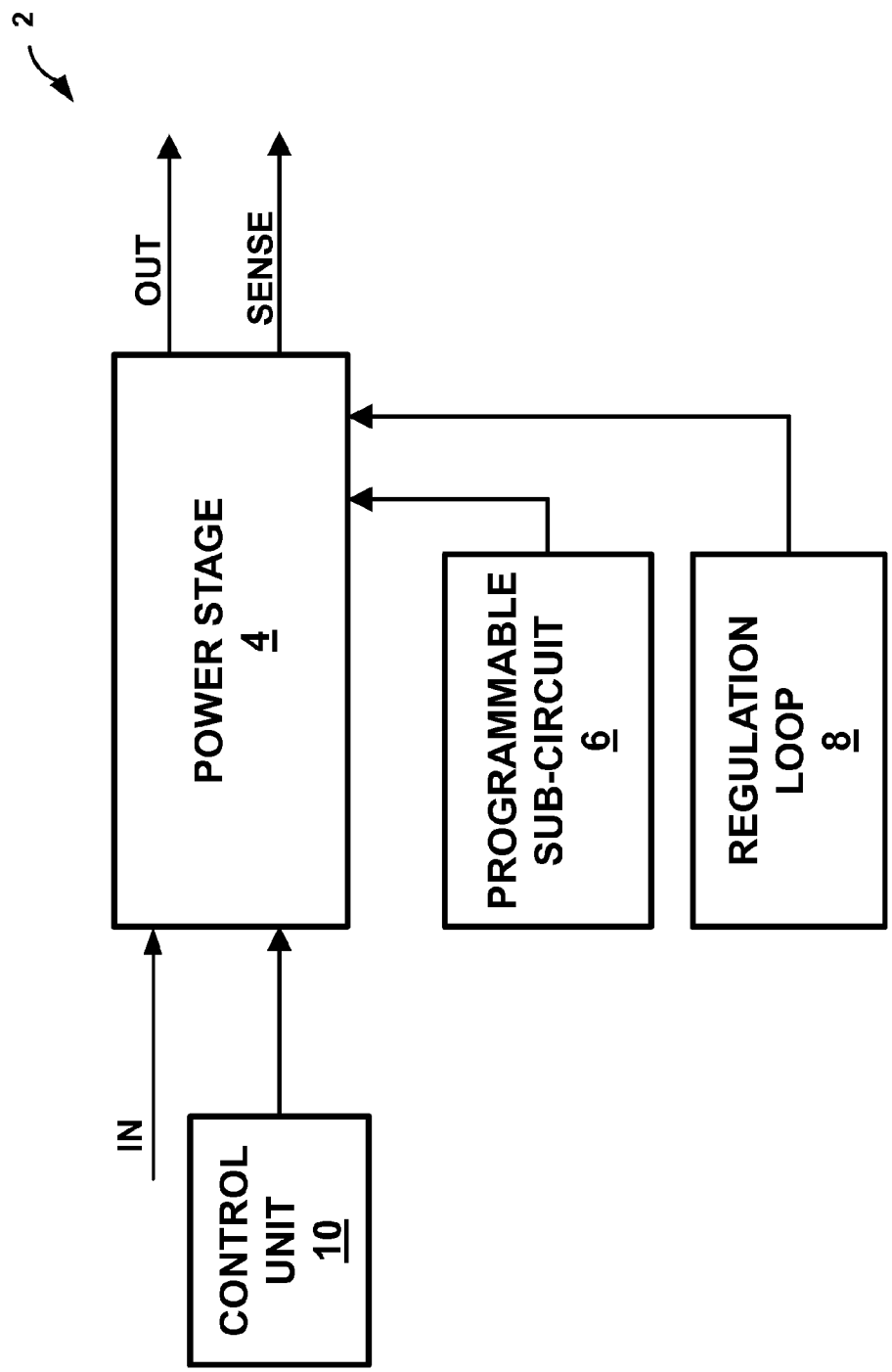
FIG. 1 is a block diagram illustrating an example current sense system, in accordance with one or more techniques described in this disclosure.

FIG. 1 is a block diagram illustrating an example current sense system 2, in accordance with one or more techniques described in this disclosure. The current sense system 2 is configured to precisely determine a current flowing in the current sense system 2. Tracking current system 2 includes a power stage 4, a programmable sub-circuit 6, a voltage regulation loop 8, and a control 10.

Power stage 4 receives as input a power signal and a signal from control 10. Coupled to power stage 4 are programmable sub-circuit 6 and voltage regulation loop 8. Power stage 4 may include a PNP bipolar junction transistor ("BJT") power stage (e.g., a power transistor). The PNP power stage may have features including low drop, reverse polarity and robustness (for example electromagnetic interference ("EMI"), electrostatic discharge ("ESD"), short-circuit, etc.). Power stage 4 may further include one or more current mirrors. For example, power stage 4 includes a PNP mirror as a current sense (e.g., a sense transistor). The PNP mirror as a current sense allows for no additional current drop due to current sensing and provides low sensitivity to temperature changes. In other examples, power stage 4 may include other types of transistors. Power stage 4 provides two outputs, including a current output, $I_{out}$, and an output of the current sense, $I_{sense}$.

Programmable sub-circuit 6 may be programmed to trim a specific current mirror ratio for one or more of the current mirrors in power stage 4. Programmable sub-circuit 6 includes one or more programmable elements, that is, one or more programmable elements are able to be configured in such a way to achieve the selected current mirror ratio. In some examples, programmable sub-circuit 6 can only be configured once. That is, once the one or more elements have been configured once, they are unable to be reconfigured. In other examples, programmable sub-circuit 6 may be configured multiple times. That is, the one or more elements are able to be reconfigured after already having been configured. The one or more programmable elements may be programmed via diode zapping, laser fusing, or using a serial peripheral interface ("SPI"). SPI is a serial data link that allows the transfer of data (e.g., trimming words) from a microcontroller to a device (e.g., such as programmable sub-circuit 6). Due to programmable sub-circuit 6, the current mirror of power stage 4 has a wide range of potential mirror ratios. Furthermore, current is shifted from sense, $I_{sense}$, to output, $I_{out}$, in order to adjust the mirror ratio to the target value. Thus, no current is shifted to ground.

Voltage regulation loop 8 may act as a feedback loop for power stage 4. Voltage regulation loop 8 receives, as input, signals from power stage 4, such as collector output voltages of a power transistor and a sense transistor. An output of voltage regulation loop 8 is fed back to the sense transistor of power stage 4, and thus acts as a collector-to-emitter potential voltage regulator for power stage 4. Regulating the collector voltages in this manner reduces the Early effect on the mirror ratio, thus reducing errors of current sense system 2.

Current sense system 2 may comprise a precise current sense system which may be produced using low-cost technology (for example, using bipolar transistors), with a precision that can be trimmed up to an extent. The precision may be controlled during a design phase. Current sense system 2 may be integrated on chip using low cost silicon (Si) technologies.

Figure 2:
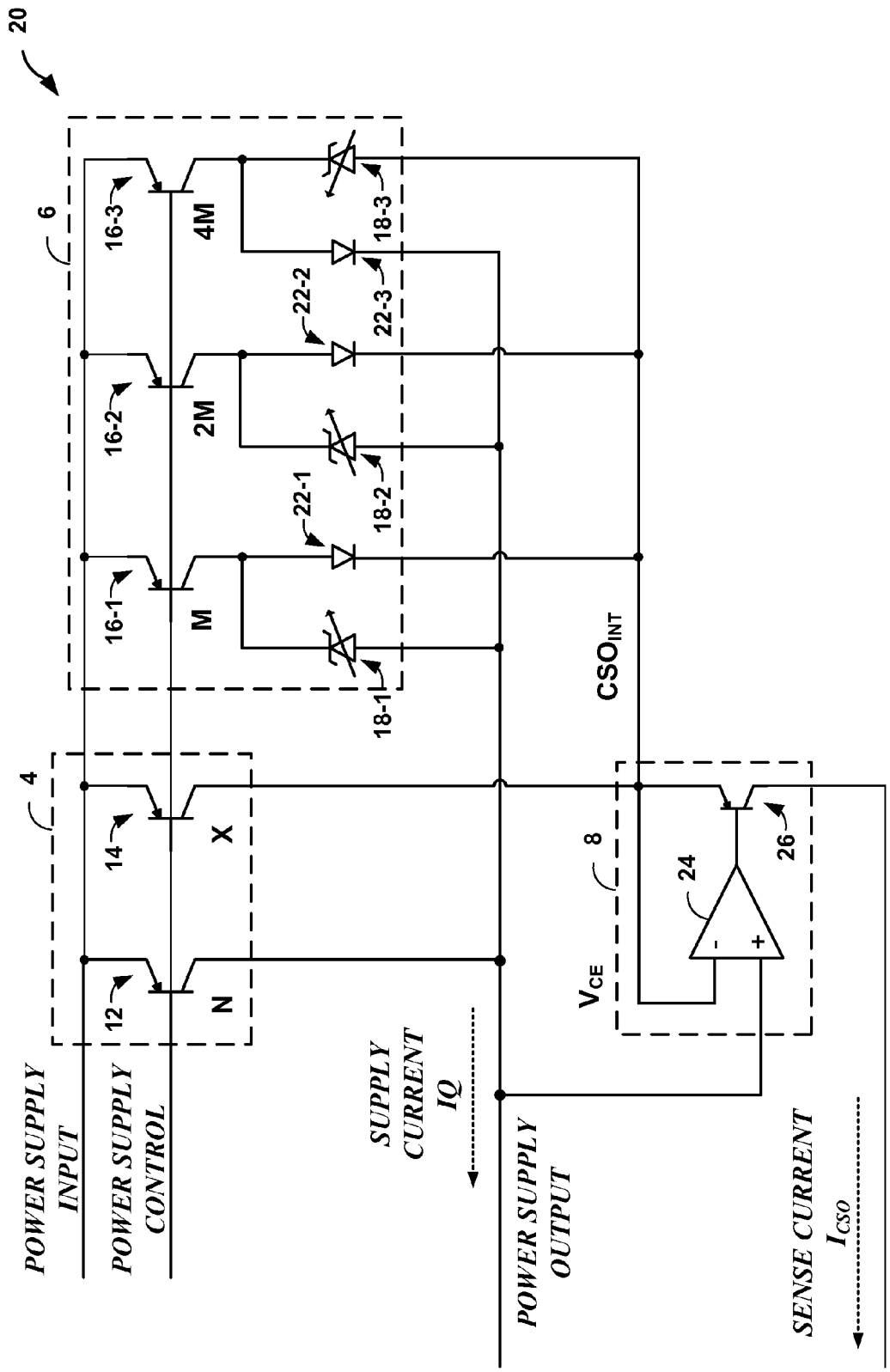
FIG. 2 is a schematic diagram illustrating an example current sense circuit, in accordance with one or more techniques described in this disclosure.

FIG. 2 is a schematic diagram illustrating an example current sensing circuit 20, in accordance with one or more techniques described in this disclosure. Current sensing circuit 20 is an example implementation of current sense system 2 of FIG. 1. Current sensing circuit 20 includes a power stage 4, a programmable sub-circuit 6, and a voltage regulation loop 8.

Power stage 4 includes a power transistor 12 and a sense transistor 14. A power supply control signal controls a base or gate of power transistor 12. In some examples, a base of sense transistor 14 is coupled to the base of power transistor 12. In other examples, the base of sense transistor 14 directly receives the power supply control signal. A power supply input signal is connected to a terminal of both power transistor 12 and sense transistor 14. For example, the power input signal may be connected to a collector of both power transistor 12 and sense transistor 14. In examples where both power transistor 12 and sense transistor 14 are PNP transistors, the power supply input signal may be connected to an emitter. One or both of power transistor 12 and sense transistor 14 may be a bipolar junction transistor (BJT), such as a PNP bipolar transistor or an NPN, a metal oxide semiconductor field effect transistor (MOSFET) transistor, for example, an N-type MOSFET, a metal-semiconductor field effect transistor (MESFET), complementary metal oxide semiconductor (CMOS), or any other type of transistor. In the example of FIG. 2, power transistor 12 and sense transistor 14 are PNP transistors.

Sense transistor 14 functions as a current mirror of power transistor 12. Power transistor 12 has a size given as N and sense transistor 14 has a size given as X. A transistor with a larger size may have a larger area or weight than a transistor with a smaller size. A current mirror has a mirror ratio that indicates a relationship of the current that is copied. In some examples, power transistor 12 is a large power transistor and sense transistor 14 is a smaller transistor embedded as a current mirror of power transistor 12. In this example, ignoring any effects due to programmable sub-circuit 6, the mirror ratio is X:N.

Programmable sub-circuit 6 may change the mirror ratio based on the state of one or more programmable elements 18-1 through 18-3 (collectively referred to herein as "programmable elements 18"). Programmable sub-circuit 6 also comprises one or more transistors 16-1 through 16-3 (collectively referred to herein as "transistors 16"). Transistors 16 are coupled between one of programmable elements 18 and receive the power supply signal at their collectors or emitters (e.g., for PNP) and power supply control signal at their gates. Transistors 16 may be any type of transistor, such as BJT, NPN-type BJT, PNP-type BJT, MOSFET, MESFET, gallium nitride (GaN) transistors, and the like. Transistors 16 may have various sizes. For example, transistor 16-1 has a size given as M, transistor 16-2 has a size given as 2M (that is, transistor 16-2 is twice the size or size as transistor 16-1), and transistor 16-3 has a size given as 4M (that is, transistor 16-3 is twice the size or size as transistor 16-2).

Programmable elements 18 may operate in one of two states: an open state and a closed state. In the open state, programmable elements 18 do not allow current to flow through them or only allow current to flow in one direction. In the closed state, programmable elements 18 allow current to flow through them in both directions. Thus, current is directed through different paths based on the operating states of the one or more programmable elements 18. Based on the design of programmable sub-circuit 6, directing current through different paths can increase or decrease the mirror ratio. When a programmable element 18 is shorted, it takes the current coming from the programmable PNP to which it is coupled. Otherwise, if open, the current coming from the programmable element 18 flows through the alternative path. As a result, the supply to sense current ratio (i.e., the mirror ratio) changes.

In some examples, in the open state, programmable elements 18 do not allow current below a threshold current level to pass through. Each programmable element 18 may have its own threshold current level that is determined by parameters or characteristics of the specific programmable element. However, once a current is provided to a programmable element 18 above its threshold current level, the programmable element 18 may be shorted and convert to the closed state.

As shown in FIG. 2, three programmable elements 18 are included in programmable sub-circuit 6 and comprise zener zap diodes (also referred to herein as "zap diodes 18"). When zap diodes 18 are not zapped, they prevent current that is below a threshold zapping level from flowing through in one direction. As shown in FIG. 2, while in the open state (e.g., not "zapped"), zap diode 18-1 prevents current from flowing from transistor 16-1 to the power supply output (that is, the supply current), but allows current to flow in the opposite direction. Similarly, while in the open state, zap diode 18-2 prevents current from flowing from transistor 16-2 to the power supply output (that is, the supply current), but allows current to flow in the opposite direction. However, zap diode 18-3 is located on a sense current path, while zap diodes 18-1 and 18-2 are on a power supply output path. While in the open state, zap diode 18-3 prevents current from flowing from transistor 16-3 to the sense current output, and as a consequence, the current flows to the power supply output.

Once zapped (that is, a current above the threshold zapping level is applied), zap diodes 18 switch from operating in the open state to operating in the closed state. In examples using zap diodes 18, each zap diode may be zapped only once and cannot be reverted back to operating in the open state. As shown in FIG. 2, while in the closed state (e.g., "zapped"), zap diode 18-1 allows current to flow from transistor 16-1 to the power supply output and also allows current to flow in the opposite direction. Similarly, while in the closed state, zap diode 18-2 allows current to flow from transistor 16-2 to the power supply output and allows current to flow in the opposite direction. Furthermore, while in the closed state, zap diode 18-3 allows current to flow from transistor 16-3 to the power supply output and allows current flowing in the opposite direction.

As discussed herein, anyone can trim current sensing circuit 20 by zapping zap diodes 18. Example users that may program zap diodes 18 include an original equipment manufacturer (OEM) who manufactures current sensing circuit 20, a designer who designs current sensing circuit 20, anyone who implements current sensing circuit 20 into an application, and an end user of current sensing circuit 20, among others. In some examples, once current sensing circuit 20 is programmed, it cannot be programmed except to further zap additional unzapped zap diodes 18. In other examples, current sensing circuit 20 may be repeatedly programmed.

In other examples, other types of programmable elements 18 may be used. In some examples, programmable elements 18 may be able to switch from open state to closed state multiple times. In some examples, programmable elements 18 may be other types of devices, such as, for example, fuses or opportunely driven switches. In some examples, programmable elements 18 programmed via diode zapping, laser fusing, or using SPI.

Programmable sub-circuit 6 also includes one or more diodes 22-1 through 22-3 (collectively referred to herein as "diodes 22"). One diode 22 is paired with a programmable element 18, but is connected to the other output (e.g., either power supply output or sense current output). For example, diode 22-1 is coupled to one side of zap diode 18-1 and also to the sense current (e.g., $CSO_{INT}$).

Current sensing circuit 20 further comprises voltage regulation loop 8. Voltage regulation loop 8 is a feedback loop for power stage 4 that reduces the Early effect of the current mirror. Voltage regulation loop comprises a comparator 24 and a transistor 26. Comparator 24 receives at one input the voltage of the node collecting the supply current, which is from the collector of power transistor 12, output of zap diode 18-1 while in the closed state, output of zap diode 18-2 while in the closed state, and output of diode 22-3 while zap diode 18-3 is in the open state. At the other input, comparator 24 receives the voltage of the node collecting the current from the collector of sense transistor 14, the output of diodes 22-1 and 22-2 while zap diodes 18-1 and 18-2 respectively are in the open state, and the output of zap diode 18-3 while in the closed state. Comparator 24 compares the power supply output voltage with the voltage $CSO_{INT}$ for any zapping combination. An output of regulation loop 8 is provided to a base of transistor 26, which is fed back to the collector of sense transistor 14.

Using this feedback, voltage regulation loop 8 acts as a collector-to-emitter potential voltage regulator for power stage 4. That is, voltage regulation loop 8 regulates the potential at the collector of sense transistor 14 to be within a threshold difference level of the potential at the collector of power transistor 12, in order to avoid the Early effect that degrades the current mirror precision. Furthermore, voltage regulation loop 8 also provides a voltage biasing of cathodes of diodes 18 and 22 in programmable sub-circuit 6. Regulating the collector voltages in this manner reduces the Early effect on the mirror ratio, thus improving the accuracy of current sense system 2.

Current sensing circuit 20 may comprise a precise current sense circuit, which may be produced using low-cost technology (for example, using bipolar transistors), with a precision that can be trimmed. The precision may be controlled during the design phase of current sensing circuit 20.

Figure 3:
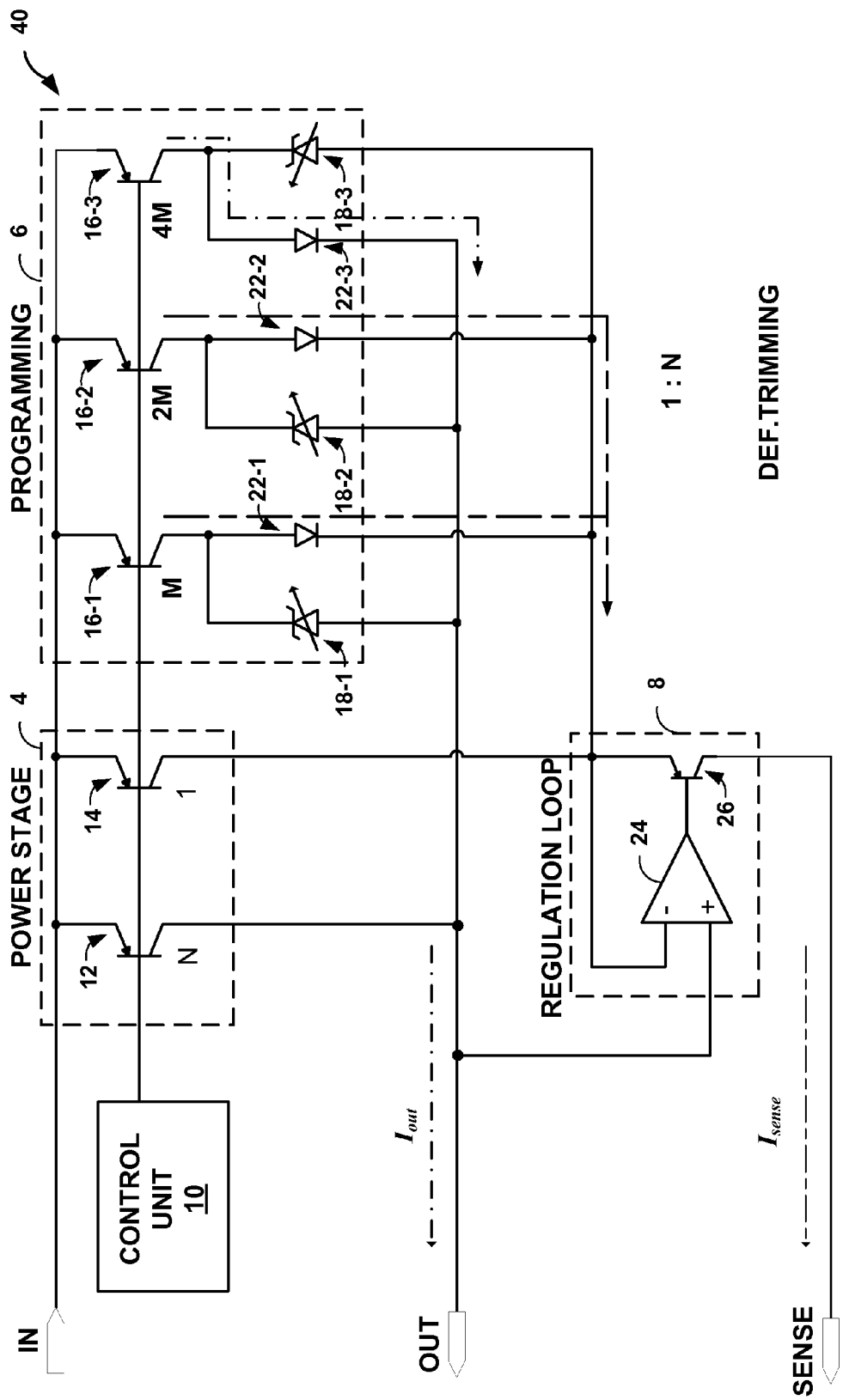
FIG. 3 is a schematic diagram illustrating example current flow in an untrimmed current sense system, in accordance with one or more techniques described in this disclosure.

FIG. 3 is a schematic diagram illustrating example current flow in an untrimmed current sense system 40, in accordance with one or more techniques described in this disclosure. Various examples of current sense system 40 may include aspects or features described herein with respect to other example circuits or systems, such as, for example, current sense system 2 of FIG. 1 and current sense circuit 20 of FIG. 2. Inasmuch as features of current sense system 40 are similar to those already described with respect to FIGS. 1 and 2, they are not again discussed with respect to FIG. 3. Current sense system 40 comprises power stage 4, programmable sub-circuit 6, voltage regulation loop 8, and control unit 10. The ratio of sense transistor 14 to power transistor 12 in this example is 1:N.

In FIG. 3, each zap diode 18 is operating in the open state (that is, not zapped). Thus, current sense system 40 is in an untrimmed state and has the base mirror ratio of 1:N. Current flowing for each output, $I_{out}$ and $I_{sense}$, is denoted in FIG. 3 using unique line patterns for each output. Thus, as illustrated, current flows through diode 22-3 for $I_{out}$. Similarly, current flows through diodes 22-1 and 22-2 for $I_{sense}$.

Figure 4:
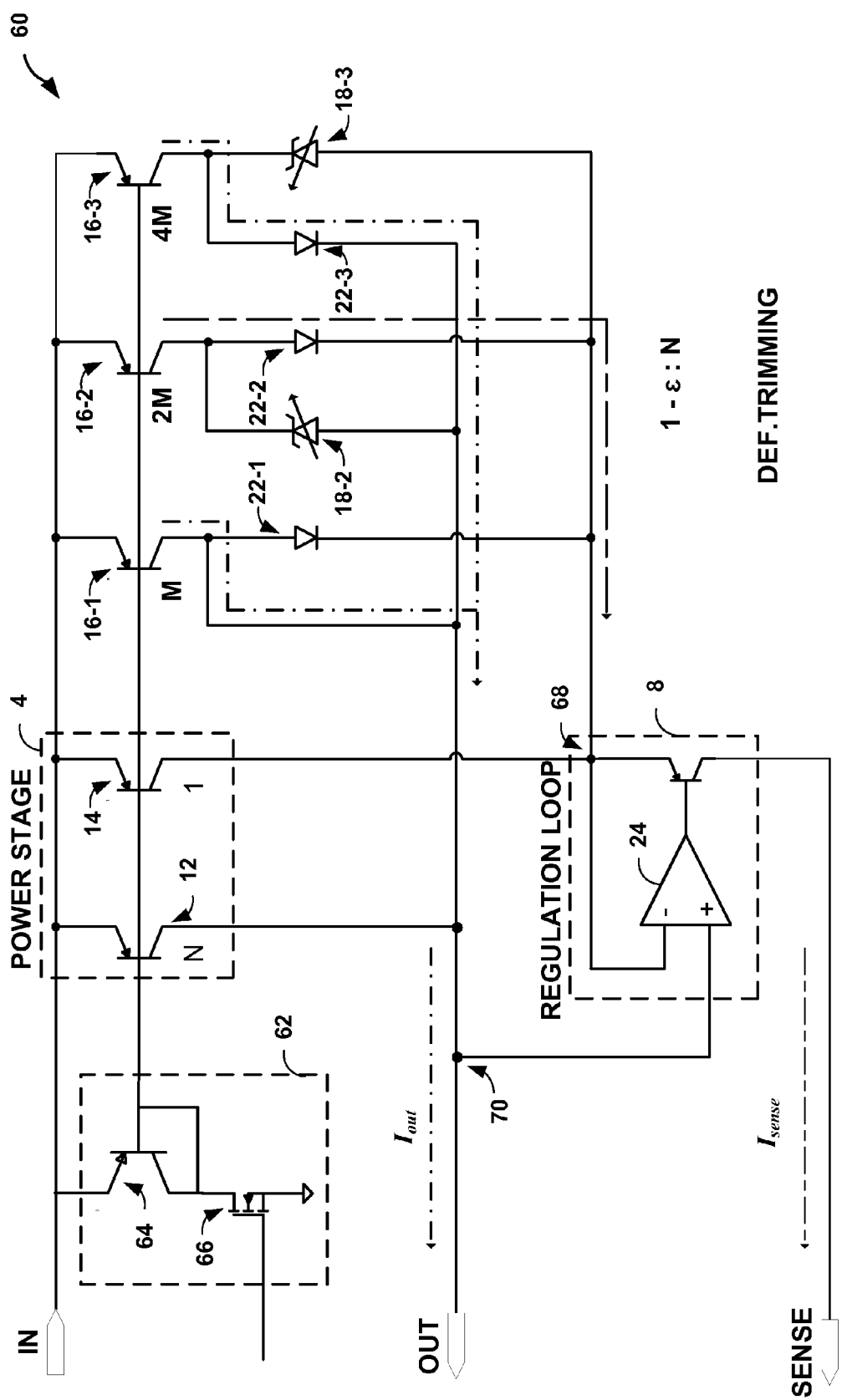
FIG. 4 is a schematic diagram illustrating example current flow in a trimmed current sense system, in accordance with one or more techniques described in this disclosure.

FIG. 4 is a schematic diagram illustrating example current flow in a trimmed current sense system 60, in accordance with one or more techniques described in this disclosure. Various examples of current sense system 40 may include aspects or features described herein with respect to other example circuits or systems, such as, for example, current sense system 2 of FIG. 1, current sense circuit 20 of FIG. 2, and current sense system 40 of FIG. 3. Inasmuch as features of current sense system 60 are similar to those already described with respect to FIGS. 1-3, they are not again discussed with respect to FIG. 4. Current sense system 60 comprises power stage 4, voltage regulation loop 8, and control unit 62. Current sense system also comprises a programmable sub-circuit, which is not indicated out of concerns for clarity.

Control unit 62 comprises two devices 64 and 66 that are used to provide a control signal to power stage 4. Devices 64 and 66 may be transistors, which may be any transistor as described herein.

The ratio of sense transistor 14 to power transistor 12 in this example is 1:N. However, current sense system 60 is trimmed—that is, one or more of programmable elements 18 are in the closed state. In this example, zap diode 18-1 has been zapped. Thus, current from transistor 16-1 no longer flows through diode 22-1 but now flows through where zap diode 18-1 was. This increases the current flowing at $I_Q$ and correspondingly reduces the current flowing at $I_{CSO}$. This reduces the mirror ratio by an amount, $\epsilon$, which is based on the power of transistor 16-1. Current flowing for each output, $I_Q$ and $I_{CSO}$, is denoted in FIG. 4 using unique line patterns for each output. Thus, as illustrated, current flows through the shorted zap diode 18-1 and through diode 22-3 for $I_Q$. Similarly, current flows through diode 22-2 for $I_{CSO}$.

The amount that the mirror ratio may be increased or decreased may be selected for based on the relative values of transistors 16. In the example of FIG. 4, there are eight possible different combinations of trimming (including one untrimmed state). Examples with different numbers of programmable elements 18 will have correspondingly different numbers of trimming combinations. Thus, once the range and step magnitude of each of programmable elements 18 are chosen, it is possible to set the default (that is, untrimmed) value to any preferred position within the range.

An example step magnitude (e.g., a trimming step) may be determined based on a percentage of the current ratio. For example, using the notation of FIG. 2, a smallest trimming step may be as in Equation 1, supposing that the ratio between a size of power FET 12 to sense FET 14 to the smallest programmable device 16-1 is N:X:M.

$$\Delta\text{ratio }\% = 100\frac{M(N+X)}{N(X+M)} \quad (1)$$

Usually N>>X M, so Equation 1 can be approximated to:

$$\Delta\text{ratio }\% = 100\frac{M}{X} \quad (2)$$

For a target ratio of 1:100, a smallest step may be about the order of magnitude of 1% because the main ratio would be determined by N:X (e.g., approximately 100). So, for example, to have approximately a 1% step, M=1, X=100, and N=10,000. Once the smallest step is determined, the other steps may be approximately k times the smallest step. The largest programmability range thus depends on k, that is $2^n$ (wherein n is the number of programmable elements) and on the smallest step. In some examples, the size of the programmable elements goes up by a factor of 2. The number of programmable elements in a current sense system, n, may be any suitable number.

One possible application of current sense system 60 is provided for illustrative purposes only, and is not meant to be limiting in any way. Current sense system 60 may be used in a protected antenna power supply. A current-sense target precision of this example can be summarized as 2% over a Power-Supply output current range from 10 milliamps (mA) to 150 mA, and over temperature ranging from −40 degrees Celsius (° C.) to 125° C., for example.

In this example, a selected mirror ratio between the supply-current ($I_Q$) and the sense-current ($I_{cso}$) is $N_{ideal}=100$, which corresponds to the ratio of collectors connected to the power Supply output node and the $CSO_{int}$ node, given in Equation 3.

$$N_{ideal} = \frac{PnpOUT_{coll}}{PnpSENSE_{coll}} = 100 \quad (3)$$

The collectors of transistors 16 in programmable sub-circuit 6 contribute to the current ratio. Element M, in this example, consists of a single collector, and the current in the collector of sense transistor 14 is given as $PnpSENSE_{coll}=47$ by default. Thus, in this example, a smallest programmable step is 1 collector (~2.1%), and the programmable range is from 0 to 7 collectors.

Moreover, as the 4M transistor 16-3 is connected by default to $I_Q$ while M and 2M are connected to $I_{cso}$, the un-trimmed value of the mirror ratio is set close to the target value of 100, and the programmable range is bidirectional, as summarized in Table 1. Table 1 provides an example current mirror ratio programming table for the example implementation discussed herein.

TABLE 1

| Programming Step | Programming Word 4M | 2M | M | PnpSENSE$_{coll}$ | Ratio: $\frac{I_Q}{I_{CSO}}$ |
|---|---|---|---|---|---|
| 1 | 1 | 0 | 0 | 54 | 92.6 |
| 2 | 1 | 0 | 1 | 53 | 94.3 |
| 3 | 1 | 1 | 0 | 52 | 96.1 |
| 4 | 1 | 1 | 1 | 51 | 98 |
| 5 | 0 | 0 | 0 | 50 | 100 |
| 6 | 0 | 0 | 1 | 49 | 102 |
| 7 | 0 | 1 | 0 | 48 | 104.2 |
| 8 | 0 | 1 | 1 | 47 | 106.4 |

The programming step column in Table 1 lists the possibilities of trimming combinations, 1 through 8. The second column shows a programming word, for each transistor 16, corresponding to 4M (transistor 16-3), 2M (transistor 16-2), and M (transistor 16). A value of "1" indicates the corresponding zap diode 18 has been zapped (short circuited), while a value of "0" indicates the zap diode 18 is not zapped (open circuit). The default, untrimmed option is programming step 5, where all zap diodes 18 are not zapped.

The third column, labeled $PnpSENSE_{coll}$, is the number of collector generating the sense current, intended as X+kM, wherein k depends on the trimming word or programming step. The fourth column, labeled Ratio:

$$\frac{I_Q}{I_{cso}},$$

is the corresponding mirror ratio. At the untrimmed value, X=50 and the mirror ratio is centered at 100. With $PnpSENSE_{coll}=47$ by default, the untrimmed value is 50 (programming step 5). Thus, in this example, with three programmable elements, deviations of mirror ratio from −8.3% to +6.4% with a step of ~2.1% can be compensated for. For example, for programming step 1, zapping diode 18-1 (corresponding to transistor 16-3 whose size is 4M) has been zapped, while zapping diodes 18-2 and 18-3 (corresponding to transistor 16-2 with size M and transistor 16-3 with size 2M, respectively) are unzapped. Thus, the value of $PnpSENSE_{coll}$ for programming step 1 is 47+4+2+1=54. The ratio $$\frac{I_Q}{I_{cso}}$$

is given as 5000/54=92.6.

Further, voltage regulation loop 8 regulates the potential at a node 68 ($CSO_{int}$) to be approximately the same value as the node 70 (power supply output), in order to reduce errors in the mirror ratio due to the Early effect. Finally, the sense-current $I_{cso}$ may flow to an external resistor $R_{cso}$, and is converted to a voltage $V_{cso}$ which is related to $I_Q$ as shown in Equation 4.

$$V_{cso} = I_{cso} \cdot R_{cso} = \frac{I_Q}{\text{Ratio}} \cdot R_{cso} \quad (4)$$

Figure 5:
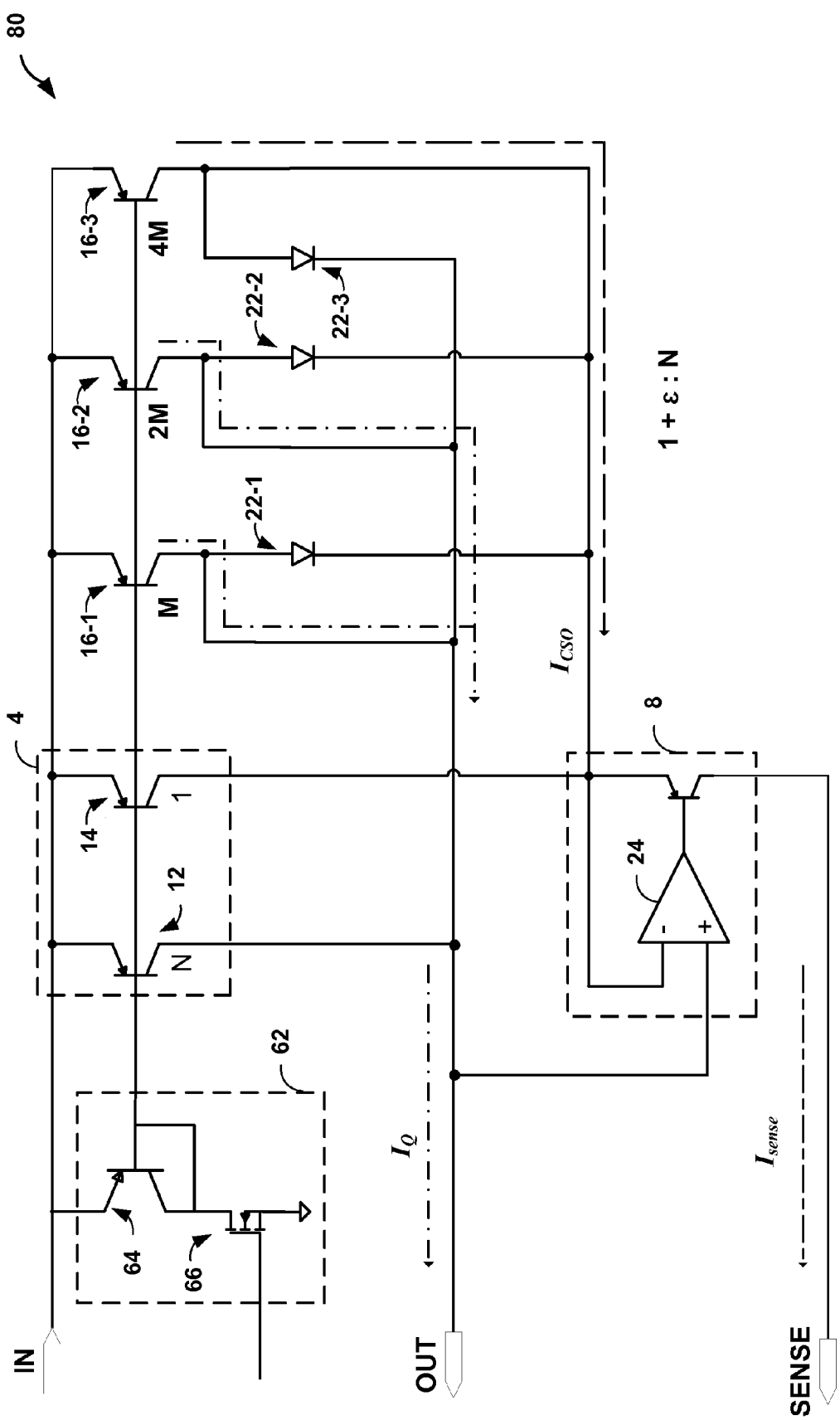
FIG. 5 is a schematic diagram illustrating another example current flow in a trimmed current sense system, in accordance with one or more techniques described in this disclosure.

FIG. 5 is a schematic diagram illustrating another example current flow in a trimmed current sense system 80, in accordance with one or more techniques described in this disclosure. Various examples of current sense system 40 may include aspects or features described herein with respect to other example circuits or systems, such as, for example, current sense system 2 of FIG. 1, current sense circuit 20 of FIG. 2, current sense system 40 of FIG. 3, and current sense system 60 of FIG. 4. Inasmuch as features of current sense system 80 are similar to those already described with respect to FIGS. 1-4, they are not again discussed with respect to FIG. 5. Current sense system 80 comprises power stage 4, voltage regulation loop 8, and control unit 62. Current sense system 80 also comprises a programmable sub-circuit, which is not indicated out of concerns for clarity.

The ratio of sense transistor 14 to power transistor 12 in this example is 1:N. However, current sense system 80 is trimmed—that is, one or more of programmable elements 18 are in the closed state. In this example, all zap diodes 18 have been zapped. Thus, current from transistors 16 no longer flow through diodes 22. This changes both the current flowing at $I_Q$ and the current flowing at $I_{CSO}$. Overall, this increases the mirror ratio by an amount, $\epsilon$, which is based on the power of transistors 16. Current flowing for each output, $I_Q$ and $I_{CSO}$, is denoted in FIG. 5 using unique line patterns for each output.

Systems and devices described proposes a solution to a common issue in power supplies products: a precise current sense which may be produced also in a low-cost technology (e.g. bipolar only), with a precision that can be trimmed up to an extent which can be controlled during the design phase, by means of programmability. The programmability of power PNP and sense collectors is used to trim the mirror ratio to a desired value. A voltage regulation loop is provided which regulates the potential at the collector of the sense transistors to be the same as the power PNP, in order to avoid Early effect that would otherwise degrade the mirror precision.

Figure 6:
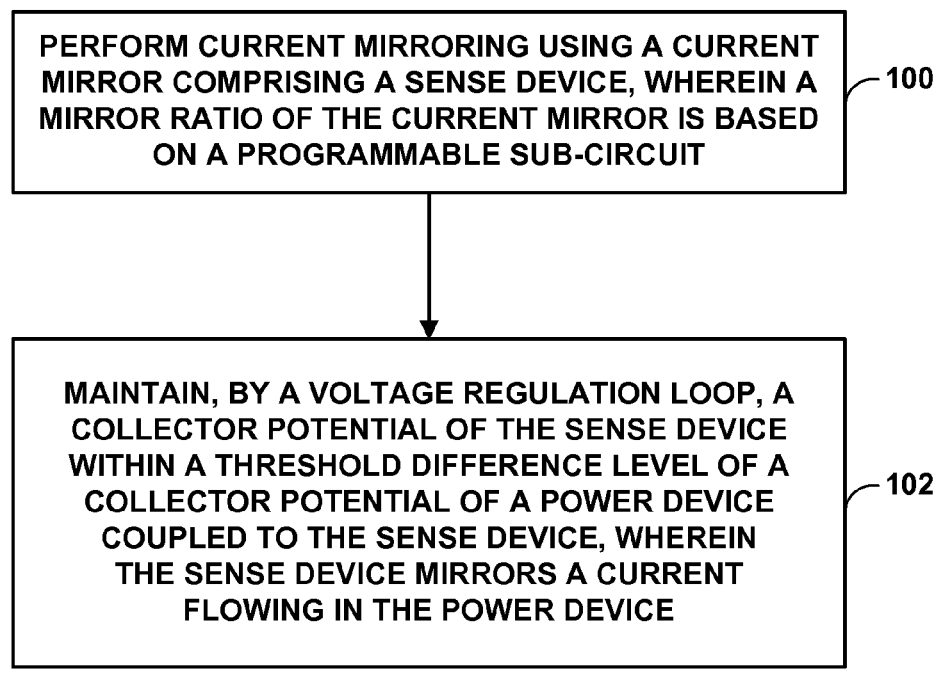
FIG. 6 is a flowchart illustrating an example method for operating a current sense circuit, in accordance with one or more techniques described in this disclosure.

FIG. 6 is a flowchart illustrating an example method for operating a current sense circuit, in accordance with one or more techniques described in this disclosure. The example method may be employed to operate devices and systems illustrated in this disclosure, such as current sense system 2, current sense circuit 20, and current sense systems 40, 60, and 80, although the described method is not necessarily limited to use with these circuits, and may be used with other circuit configurations.

The example method includes performing current mirroring using a current mirror comprising a sense device, wherein a mirror ratio of the current mirror is based on a programmable sub-circuit (100). The mirror ratio of the current mirror based on the programmable sub-circuit may be further based on one or more programmable elements of the programmability sub-circuit coupled to the sense device and the power device. For example, the mirror ratio of the current mirror comprising sense transistor 14 may be trimmed by programming one or more programmable elements 18 of programmable circuit 6. In some examples, trimming the mirror ratio of the current mirror may further include programming one or more programmable elements of a programmability sub-circuit coupled to the sense device and the power device to set the mirror ratio. For example, in current sense system 60 of FIG. 4, zap diode 18-1 was zapped to reduce the mirror ratio. An OEM or a user of the current sense circuit may trim the mirror ratio, for example.

The one or more programmable elements may further comprise one or more of a first shorted programmable element, wherein the first shorted programmable element increases the mirror ratio and a second shorted programmable element, wherein the second shorted programmable element decreases the mirror ratio. For example, FIG. 4 illustrates the mirror ratio being increased because one or more of the programmable elements 18-1 and 18-2 is shorted. Whereas in FIG. 5, the mirror ratio is decreased a small amount in total by increasing it because both programmable elements 18-1 and 18-2 are shorted and decreasing it more because programmable element 18-3 is shorted. In one example, the mirror ratio may be decreased more with only having programmable element 18-3 shorted and having programmable elements 18-1 and 18-2 remain not shorted.

In some examples, programming the one or more programmable devices may further comprise one or more of shorting one or more of the programmable elements to increase the mirror ratio and shorting one or more of the programmable elements to decrease the mirror ratio. As mentioned above, an OEM or a user of the current sense circuit may program the mirror ratio by shorting one or more programmable elements, for example.

The example method may also include maintaining, by a voltage regulation loop, a collector potential of the sense device within a threshold difference level of a collector potential of a power device coupled to the sense device, wherein the sense device mirrors a current flowing in the power device (102). In some examples, the sense device mirrors a current in a $CSO_{INT}$ net. For example, voltage regulation loop 8 may maintain the collector potential of sense transistor 14 within a threshold difference level of the collector potential of power transistor 12.

Furthermore, the current may actually be sensed. The method may further include detecting the current sense at an output of the voltage regulation loop. For example, current sensing can be performed using current sensing circuit 20 by directly mirroring the current flowing on the output device of the power supply, by means of a current mirror, and reading the current $I_{CSO}$.

In some current sense systems, precision may be limited due to statistical variations of process parameters causing power transistor 12 and sense transistor 14 to mismatch. Large mirror ratios may reduce current consumption, but at the cost of additional mismatch between currents. As the PNP devices may have, in principle, different collector potentials, Early effect may reduce the current mirror precision, and thus the overall current sense accuracy. However, the programmability and voltage regulation described herein increase the accuracy of current sense systems.

Some example devices and systems described herein comprise a current sense based on current mirroring, with the addition of a relatively simple circuit to add programmability to the sense current, plus a regulation loop to keep the collector-to-emitter potentials at approximately the same level for the two transistors. Thus, mirror ratio errors which may be due to statistical variations of process parameters, impact of poor layout of devices (e.g., due to high mirror ratios or optimize area consumption) can be compensated for using programmability up to an extent controllable during the design phase. Moreover, this is a simple and robust concept that can be implemented in most low-cost technologies (bipolar and CMOS, for example), and it is suited to operate at high voltages. That is, once the range and the step magnitude of the programmable elements are chosen, it is possible to set the default (that is, untrimmed) value to any preferred position within the range. Example devices and systems described herein may be included in applications for fault protection, current limiting, current regulation, among other reasons.

The value of the transistors and the number of programmable elements may be chosen by a designer to fulfill specifications of an application or system. Furthermore, any features of devices and circuits described herein may be used in combination. Current sense circuits described herein are capable of high voltages, are relatively simple, low-cost, robust, and are area efficient.

The examples described herein may be used in a wide array of applications. Such applications may include, for example, DC-DC converters, which may include buck converters such as desktop or server central processing unit ("CPU") core voltage ("Vcore") and non-Vcore buck converters, single-phase point-of-load ("POL") application, multiphase POL applications, and high power density voltage regulator modules ("VRM"). Further, some of the examples described herein may be used in CPU or graphics processing unit ("GPU") regulation in notebooks, desktop graphics cards, double data rate ("DDR") memory, or graphic memory. Further, the devices and technologies described herein may be used in any applications using half bridges or full bridges.

Various examples and techniques have been described. Aspects or features of examples described herein may be combined with any other aspect or feature described in another example. These described examples and other examples are within the scope of the following claims.

What is claimed is:

1. A current tracking circuit comprising:
a current mirror that receives a power supply input and a control signal as inputs, wherein the current mirror has a mirror ratio;
a programmable sub-circuit coupled to the current mirror that trims a value of the mirror ratio;
wherein:
the programmable sub-circuit further comprises one or more Zener zap diodes configured to operate in one of an open state or a closed state, wherein the value of the mirror ratio depends on the state of the one or more Zener zap diodes,
the one or more Zener zap diodes comprise a first Zener zap diode, a second Zener zap diode, and a third Zener zap diode,
the first Zener zap diode and the second Zener zap diode are coupled to a terminal of a power transistor,
the current mirror is a sense transistor coupled to the power transistor,
the third Zener zap diode is coupled to a terminal of the sense transistor, and
as compared to the mirror ratio when operating in the open state, the first Zener zap diode and the second Zener zap diode increases the mirror ratio when operating in the closed state and the third Zener zap diode decreases the mirror ratio when operating in the closed state.

2. The current tracking circuit of claim 1, wherein the current mirror comprises a sense transistor,
wherein the power transistor receives the power supply input and the control signal as inputs, and wherein the sense transistor mirrors a current flowing in the power transistor.

3. The current tracking circuit of claim 2, wherein the sense transistor and the power transistor comprise PNP transistors.

4. The current tracking circuit of claim 1, further comprising:
a voltage regulation loop configured to regulate the current mirror.

5. The current tracking circuit of claim 4, wherein the current mirror comprises a sense transistor that mirrors a current flowing in the power transistor, wherein the voltage regulation loop further comprises:
a comparator that compares a collector-to-emitter potential of the sense transistor to a collector-to-emitter potential of the power transistor in order to maintain the collector-to-emitter potential of the sense transistor at approximately the same level as the collector-to-emitter potential of the power transistor.

6. The current tracking circuit of claim 1, wherein:
the first Zener zap diode is coupled to a first transistor;
the second Zener zap diode is coupled to a second transistor; and
the third Zener zap diode is coupled to a third transistor.

7. The current tracking circuit of claim 6, wherein the first transistor has a first size, the second transistor has a second size, and the third transistor has a third size, wherein the second size is twice the first size and the third size is twice the second size.

8. A current tracking sense system comprising:
a power stage that receives a current input and a control signal as input and comprises:
a power transistor, wherein a base of the power transistor receives the control signal, a terminal of the power transistor receives the current input, and a terminal of the power transistor is input to a voltage regulation loop configured to regulate the power stage; and
a sense transistor, wherein the sense transistor acts as the current mirror and mirrors the current flowing in the power transistor, wherein a base of the sense transistor is coupled to the base of the power transistor, a terminal of the sense transistor receives the current input, and a terminal of the sense transistor is input to the voltage regulation loop; and
a programmable sub-circuit coupled to the power stage that is configured to adjust a value of a mirror ratio of the power stage;
wherein:
the programmable sub-circuit further comprises one or more Zener zap diodes configured to operate in one of an open state or a closed state, wherein the value of the mirror ratio depends on the state of the one or more Zener zap diodes,
the one or more Zener zap diodes comprise a first Zener zap diode, a second Zener zap diode, and a third Zener zap diode,
the first Zener zap diode and the second Zener zap diode are coupled to a terminal of the power transistor,
the third Zener zap diode is coupled to a terminal of the sense transistor, and
as compared to the mirror ratio when operating in the open state, the first Zener zap diode and the second Zener zap diode increase the mirror ratio when operating in the closed state and the third Zener zap diode decreases the mirror ratio when operating in the closed state.

9. The current tracking sense system of claim 8, wherein the voltage regulation loop further comprises:
a comparator that compares a collector-to-emitter potential of the sense transistor to a collector-to-emitter potential of the power transistor in order to maintain the collector-to-emitter potential of the sense transistor at approximately the same level as the collector-to-emitter potential of the power transistor.

10. The current tracking sense system of claim 8, wherein:
the first Zener zap diode is coupled to a first transistor;
the second Zener zap diode is coupled to a second transistor; and
the third Zener zap diode is coupled to a third transistor.

11. The current tracking sense system of claim 10, wherein the first transistor has a first size, the second transistor has a second size, and the third transistor has a third size, wherein the second size is twice the first size and the third size is twice the second size.

12. A method, comprising:
performing current mirroring using a current mirror comprising a sense device, wherein a mirror ratio of the current mirror is based on a programmable sub-circuit, wherein the mirror ratio of the current mirror is based on the programmable sub-circuit and is further based on one or more Zener zap diodes of the programmable sub-circuit coupled to the sense device and a power device coupled to the sense device;
maintaining, by a voltage regulation loop, a collector potential of the sense device within a threshold difference level of a collector potential of the power device, wherein the sense device mirrors a current flowing in the power device;
wherein the one or more Zener zap diodes further comprises one or more of:
a first shorted Zener zap diode, wherein the first shorted Zener zap diode increases the mirror ratio; and
a second shorted Zener zap diode, wherein the second shorted Zener zap diode decreases the mirror ratio.

13. The method of claim 12, further comprising:
detecting the sensed current at an output of the voltage regulation loop.

* * * * *